United States Patent
Snyder et al.

(10) Patent No.: US 8,055,537 B2
(45) Date of Patent: Nov. 8, 2011

(54) CUSTOMER SATISFACTION METHOD AND SYSTEM FOR NETWORK PRINTERS

(75) Inventors: Trevor James Snyder, Newberg, OR (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1258 days.

(21) Appl. No.: 11/693,245

(22) Filed: Mar. 29, 2007

(65) Prior Publication Data
US 2008/0243606 A1   Oct. 2, 2008

(51) Int. Cl.
*G06Q 30/00* (2006.01)
(52) U.S. Cl. ...................................... 705/14.1
(58) Field of Classification Search ............ 385/1.15; 705/14, 305; 358/1.15
See application file for complete search history.

(56) References Cited

U.S. PATENT DOCUMENTS

| | | | |
|---|---|---|---|
| 4,586,147 A * | 4/1986 | Tadokoro ....................... | 702/184 |
| 5,305,199 A * | 4/1994 | LoBiondo et al. .............. | 705/28 |
| 6,045,206 A * | 4/2000 | Igval ................................. | 347/2 |
| 6,173,128 B1 | 1/2001 | Saber et al. | |
| 6,317,848 B1 * | 11/2001 | Sorens et al. .................... | 714/48 |
| 6,798,997 B1 | 9/2004 | Hayward et al. | |
| 6,940,613 B1 | 9/2005 | Beard et al. | |
| 7,013,092 B2 | 3/2006 | Hayward et al. | |
| 7,043,551 B2 * | 5/2006 | Motoyama et al. ............ | 709/224 |
| 7,124,097 B2 | 10/2006 | Claremont et al. | |
| 7,127,433 B2 * | 10/2006 | Baker ............................ | 705/400 |
| 7,146,114 B2 | 12/2006 | Frankel et al. | |
| 7,701,595 B2 * | 4/2010 | Carling et al. ............... | 358/1.13 |
| 2002/0194064 A1 | 12/2002 | Parry et al. | |
| 2003/0046171 A1 * | 3/2003 | Whale .............................. | 705/26 |
| 2003/0128991 A1 * | 7/2003 | Carling et al. ..................... | 399/8 |
| 2004/0138945 A1 * | 7/2004 | Adkins et al. ..................... | 705/14 |
| 2004/0215468 A1 * | 10/2004 | Doeberl et al. ..................... | 705/1 |
| 2004/0215533 A1 * | 10/2004 | Doeberl et al. .................. | 705/30 |
| 2004/0215580 A1 | 10/2004 | Pilu et al. | |
| 2005/0147440 A1 | 7/2005 | Nakanishi et al. | |
| 2005/0231758 A1 | 10/2005 | Reynolds | |
| 2006/0120735 A1 | 6/2006 | Adkins et al. | |
| 2006/0190324 A1 | 8/2006 | Adkins et al. | |
| 2006/0221387 A1 * | 10/2006 | Swift et al. .................... | 358/1.15 |
| 2007/0292145 A1 * | 12/2007 | Drose et al. ........................ | 399/8 |
| 2008/0126148 A1 * | 5/2008 | Buco et al. ......................... | 705/7 |

FOREIGN PATENT DOCUMENTS

EP    1118932 A2 *   7/2001
EP    1118932 A2 *   2/2005

* cited by examiner

*Primary Examiner* — John G. Weiss
*Assistant Examiner* — Bennett Sigmond
(74) *Attorney, Agent, or Firm* — Pepper Hamilton LLP

(57) ABSTRACT

A method teaches monitoring at least one printing device via a communication network. A usage profile may be received from the printing device. The usage profile may include data that reflects usage of a consumable or a number of clicks by the printing device over a period of time. The usage profile may be compared to a service history profile to create a service-dependent usage profile. If the received service-dependent usage profile satisfies a reward criterion a user of the printing device may be provided with a reward.

23 Claims, 4 Drawing Sheets

CUSTOMER SATISFACTION METHOD AND SYSTEM FOR NETWORK PRINTERS

BACKGROUND

Various methods of rewards systems are known in the art. A reward may be a given based on the amount of consumable supply bought. U.S. Patent Application Publication Number 2006/0221387 the disclosure of which is incorporated herein by reference, discusses managing printers at a variety of sites by setting targets for predetermined performance indicators. A contract manager is used to monitor the usage and optimize the performance of the printers. The printing devices are rewarded and penalized based on their usage and hitting or missing their targets. However, the system does not take into account other factors such as service time to determine if the target is met.

Alternatively, a reward may be given based on the rate of consumption of a supply. In one example, U.S. Patent Application Publication Number 2004/0138945, the disclosure of which is incorporated herein by reference, a rate of supply item consumption is determined for a customer and a reward is given as a result of the usage. However, the prior art merely provides a consumer with a reward or service rate based on the rate of consumption and does not take into account other factors such as previous consumption and repair time.

Therefore, the disclosure contained herein describes methods of resolving one or more of the problems discussed above.

SUMMARY

In one embodiment, a customer satisfaction system for one or more network printing devices includes monitoring at least one printing device via a communication network and receiving a usage profile from the at least one printing device. The usage profile includes data that reflects usage of a consumable by the at least one printing device over a period of time. The method also includes comparing the usage profile to a service history profile to create a service-dependent usage profile. If the service-dependent usage profile satisfies a reward criterion, the method includes providing a user of the at least one printing device with a reward.

Optionally, the service history profile includes data representative of a time period when the at least one printing device was repaired or serviced. The service history profile also may include past usage profiles, and it may account for unusual time periods of low usage of the at least one printing device. Optionally, the method also may include determining whether the usage profile exceeds a threshold level before comparing the usage profile to the service history profile. In some embodiments, the creation of a service-dependent usage profile further includes: (i) averaging the usage profile with one or more past usage profiles from the service history profile, and/or (ii) extrapolating usage from the usage profile using the service history profile.

Optionally, prior to comparing the usage profile, a usage profile may be created from a first printing device with a usage profile from a second printing device to create a cumulative usage profile. When this option is available, the method also may include displaying data representing the cumulative usage profile on the first printing device and displaying data representing the cumulative usage profile on the second printing device.

In some embodiments, the reward criterion may include a trend in usage over a period of time. In some embodiments, providing a user with a reward may include displaying data corresponding to the reward on the computing device. Alternately or in addition, providing a user with a reward may include printing data corresponding to the reward on the at least one printing device. The reward may includes among other things, one or more of the following: the ability to trade up; a promotional offer; a coupon; or displaying a priority service center number on the at least one printing device.

In an alternate embodiment, a method includes monitoring at least one printing device via a communication network, receiving a usage profile from the at least one printing device, and comparing the usage profile to a service history profile to create a service-dependent usage profile. The usage profile include data that reflects usage of a consumable by the at least one printing device over a period of time. The service history profile includes past usage profiles, and it accounts for unusual time periods of low usage of at least one of the printing devices. If the service-dependent usage profile satisfies a reward criterion, the method provides a user of the at least one printing device with a reward.

Optionally, the creation of a service-dependent usage profile may further include: (i) averaging the usage profile with one or more past usage profiles from the service history profile; and/or (ii) extrapolating usage from the usage profile using the service history profile.

The reward criterion may include a trend in usage over a period of time. Optionally, the reward many include displaying a priority service center number on the at least one printing device. The service history profile may include data representative of a time period when the at least one printing device was repaired or serviced.

In an alternate embodiment, a system includes a server that receives a usage profile from a printing device and compares the usage profile to a service history profile to create a service-dependent usage profile. The printing device displays the usage profile and receives a reward if the service-dependent usage profile satisfies a reward criterion. The usage profile may include data that reflects usage of a consumable by the printing device over a period of time.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition the word "comprising" as used herein is intended to mean "including but not limited to." Unless defined otherwise, all technical and scientific terms used herein have the same meanings as commonly understood by one of ordinary skill in the art.

This disclosure is generally directed toward monitoring a device in a communication network to determine rewards. In particular, a device or a user of a device may be given a reward based on usage of the device over a period of time. In one embodiment, at least one printing device may be monitored via a communication network. A usage profile may be received from the printing device. The usage profile may include data that reflects usage of a consumable by the printing device over a period of time. The usage profile may be compared to a service history profile to create a service-dependent usage profile. If the received service-dependent usage profile satisfies a reward criterion, a user of the printing device may be provided with a reward.

A printing device is an electronic device that is capable of receiving commands and printing text and/or images on a substrate. Printing devices may include, but are not limited to, printers; copiers; faxes; multifunction devices that combine print, copy, fax, and/or other capabilities; or other devices using ink or toner. As used herein, the words "ink" and "toner" are used interchangeably to refer to wet or dry material that forms an image or text on a substrate.

A user is an owner, administrator, or person using the printing device. In one embodiment, the user may not be the person who requested a print job. In an alternative embodiment, the user may be the person who requested a print job.

Figure 1:
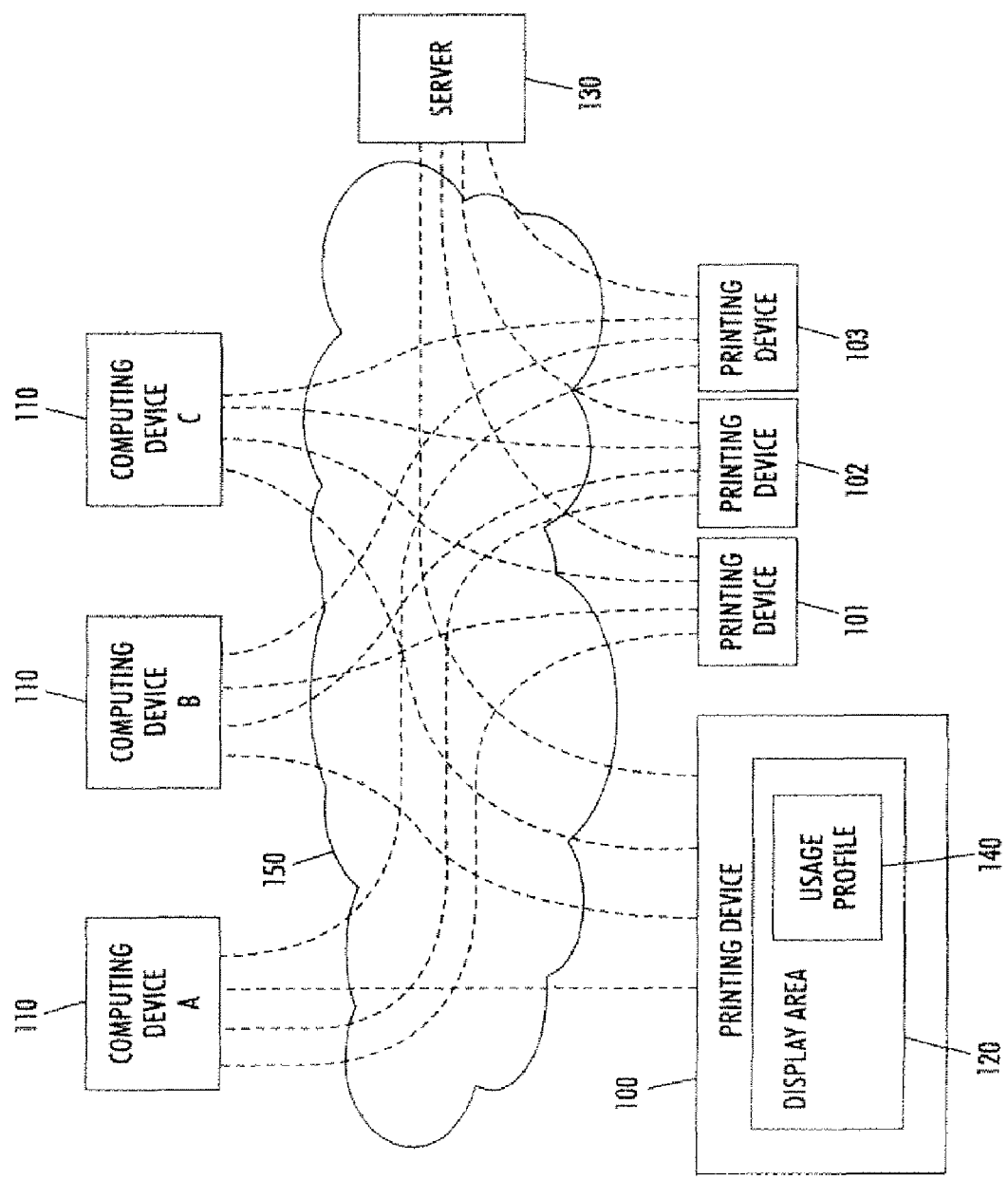
FIG. 1 is a block diagram that depicts exemplary elements of printing devices that are networked with multiple computing devices.

In one embodiment, as shown in FIG. 1, one or more printing devices 100 are in communication with one or more computing devices 110 via a network 150 such as a local area network (LAN), wide area network (WAN) Internet or another communications network. The computing devices 110 may, in some embodiments, be connected to the printing device 100 via multiple communications networks 150. In another embodiment, one or more of the computing devices may be connected to multiple printing devices 100, 101, 102, 103 via one or more networks. Alternatively, the computing devices 110 may be connected to a single printing device 100. Computing devices 110 may include, but are not limited to, computers, cell phones, personal digital assistants, gaming systems, and/or other electronic devices capable of communicating in a networked environment. As used herein the words "connected" and "connection" refers to devices that are configured for one or more networks so that they can pass information to each other through the network.

In one embodiment, a printing device 100 may contain a display area 120. A display area 120 is an electronic changeable device that represents information in visual form. A display area 120 may include, but is not limited to, a liquid crystal display (LCD), plasma display, digital light processing (DLP) display, or a light-emitting diode (LED) display. The display area 120 of a printing device 100 may receive commands to display a usage profile 140. The usage profile may be a numeric number, letter, graph, chart, symbol, a combination of these items, or another displayable image.

Figure 2:
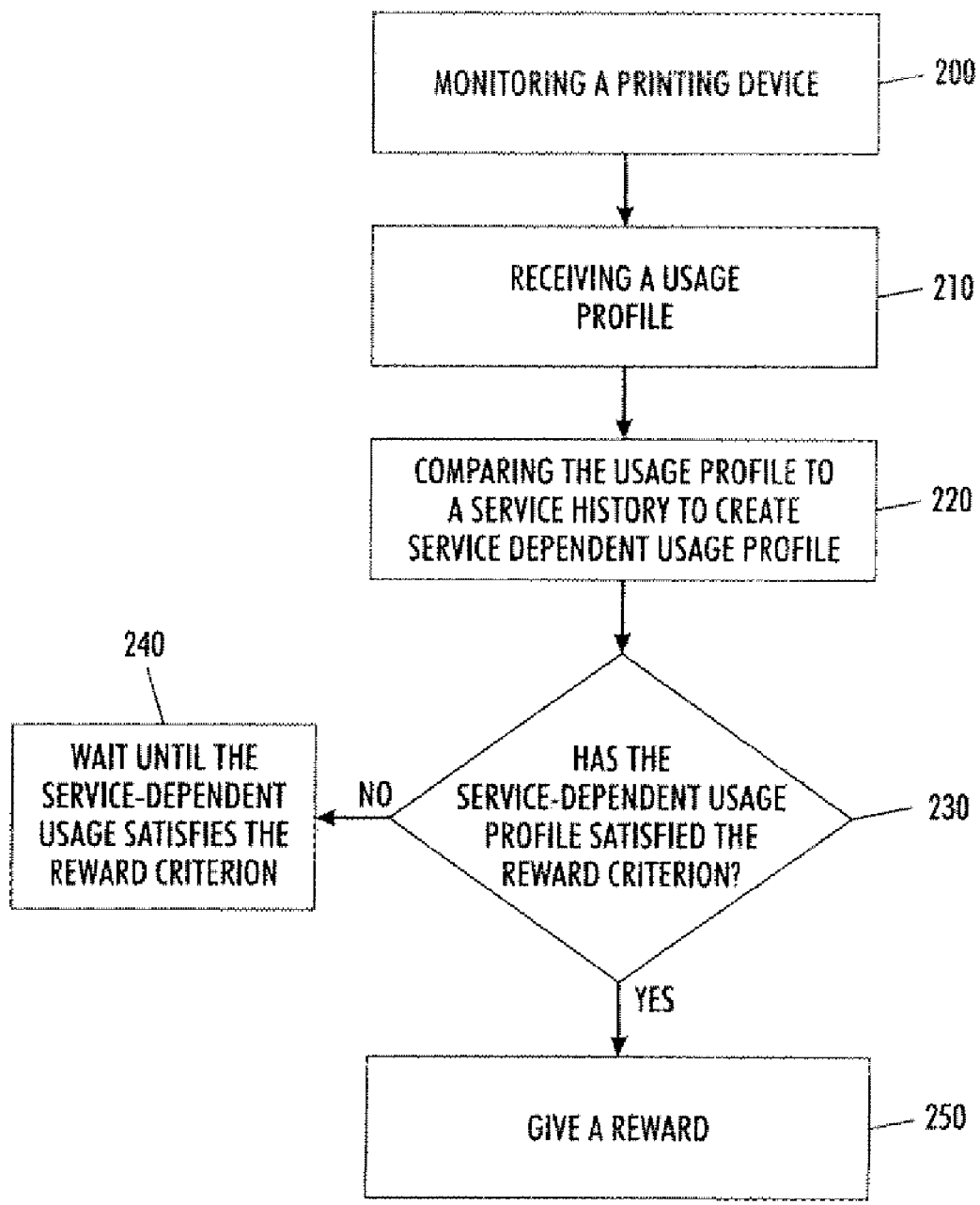
FIG. 2 depicts one embodiment of a reward system flow-chart.

FIG. 2 depicts a flowchart of a reward system. The usage of a consumable inside a printing device may be monitored 200 by a counter, calibration techniques, or other techniques known in the art. A consumable is a product that may be depleted or worn out by use. Consumables within a printing device, may include, but are not limited to, ink or an ink cartridge, toner or a toner cartridge, a printer head, and/or paper.

A usage profile may be created from the monitored usage and may be displayed in the display area of the printing device 210. A usage profile includes data that reflects usage of a consumable or a particular function by the printing device over a period of time. Alternatively, the usage profile may be an indicator of the usage of a printing device at any particular moment of time. The usage profile may be determined by an algorithm using usage information which may include, but is not limited to, a measurement of usage of at least one printer device consumable (e.g. number of pages printed, number of pages scanned, number of pages faxed, black toner consumed, color toner consumed, toner coverage per page printed, a scaled value of ink coverage multiplied by the print volume over a selected time interval, or other usage information), or a number of clicks (i.e., pages processed using a selected function). The usage profile may be determined based on a single printing device or it may be determined using aggregated usage information from a group of networked printing devices.

Referring back to FIG. 1, in one embodiment, the usage profile may track the use of one or more consumables within an individual printing device 100. In another embodiment, the usage profile may be determined externally via a server 130 in communication with the network 150. In one embodiment, the server 130 may individually track the usage profile for each printing device 100, 101, 102, 103 in the network 150. In another embodiment, the server 130 may aggregate the usage of the printing devices 100, 101, 102, 103 in the network 150 to determine a single usage profile. The server itself may also be a printing device. For example, a company may have computing devices 110 that are in communication with one or more printing devices 100, 101, 102, 103 and the use of each printing device 100, 101, 102, 103 may be aggregated to determine a single usage profile. This aggregation may allow the usage profile to reflect the company's overall use of printing device consumables, and not the use of one particular printing device 100. If the company has printing devices 100, 101, 102, 103 which aggregate use in determining the usage profile, each printing device 100, 101, 102, 103 may contain or display the aggregated usage profile.

In one embodiment, the usage profile may include three parts. In one embodiment, each part of the usage profile can be a scaled value of the ink coverage multiplied by the print volume over a set interval. One part may be the current usage, such as usage over the past day, past week or past month. The second part may be the usage over a past period of time such as, but not limited to, the usage over the past two or three months. The third part may be the usage over a more extended period of time such as, but not limited to, usage over the past six months, over the past year, or since the start of the printing device's life. In one embodiment, these parts may be displayed in any order. In one embodiment, there may be more or less than three parts that comprise the usage profile.

For example, on January 31, the usage profile could contain data for the usage for that particular day and the usage for the past month. The usage data could be compared to target levels. For example, the usage profile may indicate usage at 90% of target for that day, and 85% of target usage that month. The January 31 usage profile may be a snapshot of the usage for the 31st and the usage for the month of January.

After the usage profile is created, as described in FIG. 2, the usage profile may be compared to a service history profile to create a service-dependent usage profile 220. A service history profile is data representing the long-term usage of one or more consumables within a particular printing device. In one embodiment, the service history profile may include a variety of usage profiles from various prior dates. In another embodiment, the service history profile may account for unusual time periods of low usage which may include, for example the time periods when a printing device was repaired, inactive, maintained, and/or serviced.

In one embodiment, the usage profile may only be compared to a service history profile if the usage profile is at a certain level within a set period. For example, the usage profile may need to be over 50% of a predetermined target for a two month period in order to be compared to the service history profile. If the usage profile cannot be compared to a service history profile, then the system may wait and continue to monitor the usage.

Figure 3:
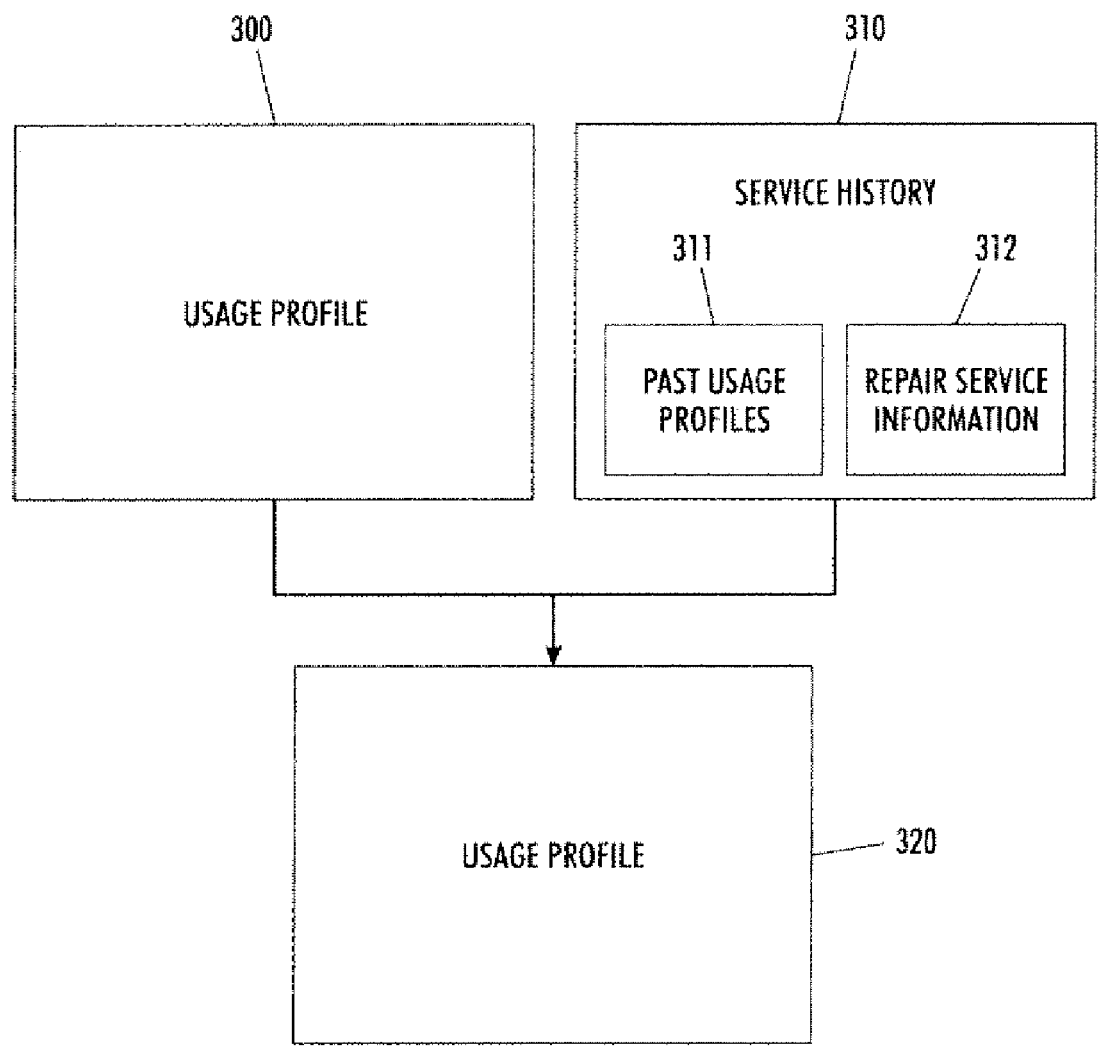
FIG. 3 discloses one embodiment of creating a service-dependent usage profile from a service history profile and a usage profile.

If a usage profile may be compared to a service history profile, then a service-dependent usage profile may be created. FIG. 3 describes how a service-dependent usage profile may be created from a service history profile and a usage profile. A service-dependent usage profile 320 includes information from the service history profile 310 and usage profile 300 over a period of time. As discussed above, the service history profile 310 may include both past usage profiles 311 and repair information 312 of the printing device. In one embodiment, the service-dependent usage profile 320 may be created by averaging the usage profiles in the service history profile with the current usage profile based on a period of time. In one embodiment, the average may be weighted. The time period examined for the service-dependent usage profile may be a set amount, random amount, variable amount, or may be based upon other factors such as, but not limited to, time of usage of the printing device, time since last reward, time since the last cartridge was replaced, and/or time of the last service contract.

In one embodiment, the service-dependent usage profile may include a service history profile reflecting periods when the machine was being repaired or serviced, or time periods when the machine required repair or service. In one embodiment, the usage may be low for a particular period of time because the machine was inactive due to a problem and was being repaired. In one embodiment, if the printing device was down for service, that information may be included in creating the service-dependent usage profile. The service-dependent usage profile may extract the days the printing device was down from the usage profile and examine one or more previous usage profiles to estimate the usage that may have occurred during that period had the printing device been active. In another embodiment, the service-dependent usage profile does not use past profiles, but recalculates the usage information based on the time the machine was active. For example, the usage profile which includes the time of inactivity due to repair may be low, but the usage otherwise may have been high during the usage profile period.

Alternatively, there are other ways the service history profile can be used in creating the service-dependent usage profile. For example, printer may have been had a maintenance issue but not been taken out of service. Such a maintenance issue may arise from, for example, a malfunctioning ink jet. The printing device could still operate during that period, but the user may have used it only sparingly because of low print quality, and the malfunction may not be discovered until after service is initiated. In such a situation, the service-dependent usage profile can take the period of low usage into account. Therefore, a printing device may still meet the reward criteria once the service history profile is taken into account when creating a service-dependent usage profile.

For example, the usage profile may be at 77% of target for December 2006. The service-dependent usage profile time period may be a three month time period. Therefore, the service history profile may include the usage profiles from November 2006 and October 2006. In one example, the system may be 67% of target in October and 72% of target in November. However, in a second example, the usage profile may be 95% of target in October and 99% of target in November.

In the first example, there was a consistent increasing trend each month. However, in the second example, usage of the machine decreased in December, but it had been active in October and November. Before a service-dependent usage profile may be created for the first and second examples, the service history profile of repairs and maintenance may be examined. In the second example, the service history profile may contain a record of the service repairs and maintenance performed on the printing device. If the December service history profile includes 5 days of repair time for the printing device within the 20-day December usage profile, the inactivity and repair time may be taken into account when determining a service-dependent usage profile. The service-dependent usage profile may be determined by extrapolating the usage on the days the printing device was active in the month of December to account for the inactive period. Therefore, depending on the service history profile, two printing devices with the exact same usage profile may have different service-dependent usage profiles depending on previous usage profiles and service repairs.

Referring back to FIG. 2, after a service-dependent usage profile is created, the system may determine if the service-dependent usage profile satisfies a reward criterion 230. If the service-dependent usage profile does not satisfy a reward criterion then the system may wait by monitoring the printing device and later receiving another usage profile which may be compared with another service history profile 240.

If the service-dependent usage profile satisfies the reward criterion, a user of the printing device may be provided with a reward 250. A reward criterion is the measure used to determine if the service-dependent usage profile of a printing device or a set of printing devices should receive an incentive or prize. Providing the award 250 may be done by any suitable method, such as by using the printing device to print a document containing data corresponding to the reward, transmitting data corresponding to the reward to a user (such as by electronic mail or fax delivery), In one embodiment, the reward criterion may be a threshold value that must be surpassed over a period of time. In another embodiment, the reward criterion may be a trend over a certain period of time. For example, a reward criterion may specify that a usage of a selected printer device consumable or function (such as color toner usage, or per-page toner coverage) must increase 10% within a five month period or that the usage must be at least 90% of target for a six month period to quality for a reward. Alternatively, various usage percentages may need to be ascertained and sustained for a period of time.

In one embodiment, the reward criterion may include various threshold values. Different awards may correspond with different threshold values. In one embodiment, as the amount of usage of the selected printer device consumable or function increases, the reward may become more substantial. In another embodiment, the longer the usage amount may be sustained, the more substantial the reward. Alternatively, the reward may be determined as a combination of amount and type of usage and the time the usage is sustained.

In one embodiment, a reward criterion may have a time period which may be used to create a service-dependent usage profile. For example, a printing device may be displaying a usage profile of 87% of target. The 87% of target may represent one week's usage of ink and paper coverage. The reward criterion may specify that in order to receive an award, the printing device must have exceeded 85% of target for four weeks. Therefore, the printing device with the 87% usage profile may use the service history profile to determine the usage profiles for the past three weeks. The usage profile of the printing device for the past four weeks may be used to create the service-dependent usage profile. Additionally, any repairs or maintenance that occurred in the past three weeks may be accounted for in the service-dependent usage profile. That service-dependent usage profile can then be examined to determine if the reward criterion, 85% of target usage for four weeks, may be met.

In another embodiment, a reward may be based on the usage and the service of a device. A reward may be given to a customer whose usage increased after a repair. In another embodiment, a reward may be a type of incentive for a customer. In one embodiment, a reward may be given to a customer whose usage has decreased after a repair in order to encourage more use of the printing device.

In one embodiment, as discussed previously, the usage profile may be based on the usage from multiple printing devices. As a result of having more than one printing device represented in the usage profile, the cumulative usage of the devices, and not each individual printing device usage, may be examined. In one embodiment, the usage profile, along with the service history profile, of multiple printing devices may be represented in one cumulative service-dependent usage profile. The cumulative service-dependent usage profile may be used to determine if a reward criterion was met. If the reward criterion was met, then each device may be entitled to the reward even if the device individually would not have been entitled to a reward. For example, referring to FIG. 1, there may be four printing devices, 100, 101, 102, 103, that may be used to create a service-dependent usage profile. One printing device 100 might have a very low usage, but the other three printing devices 101, 102, 103, may have extremely high usage. Together, all four printing devices 100, 101, 102, 103, may have a cumulative service-dependent usage profile that satisfies the reward criterion. All the printing devices may be offered the same reward, even the printing device with the low usage 100, because the cumulative service-dependent usage profile met the reward criterion.

In one embodiment, a reward may be displayed on the printing device or on the computing device. Alternatively, a reward may be printed from the printing device. A customer may be notified that a reward is available for printing, or the reward may be automatically printed by the printing device. In other embodiments, the reward may be delivered or communicated to the user using any available method, such as electronic mail, postal service, telephone, text messaging, or other delivery methods.

Rewards may involve items such as promotions involving supplies, media, and services. In one embodiment, a supply reward may be a discounted price for a particular item or set of items, such as a reduced cost per page for color copies. In one embodiment, the reward may be in the form of a coupon code for a free or discounted items. Alternatively, the reward may be the ability to trade-up. The reward may also be a service. The reward may be for a free or discounted service check-up. The reward may be, but is not limited to reduced service prices or a free service. In another embodiment, the service may relate to a supply or service contract. In another embodiment, the reward may be personalized to a customer's needs.

Figure 4:
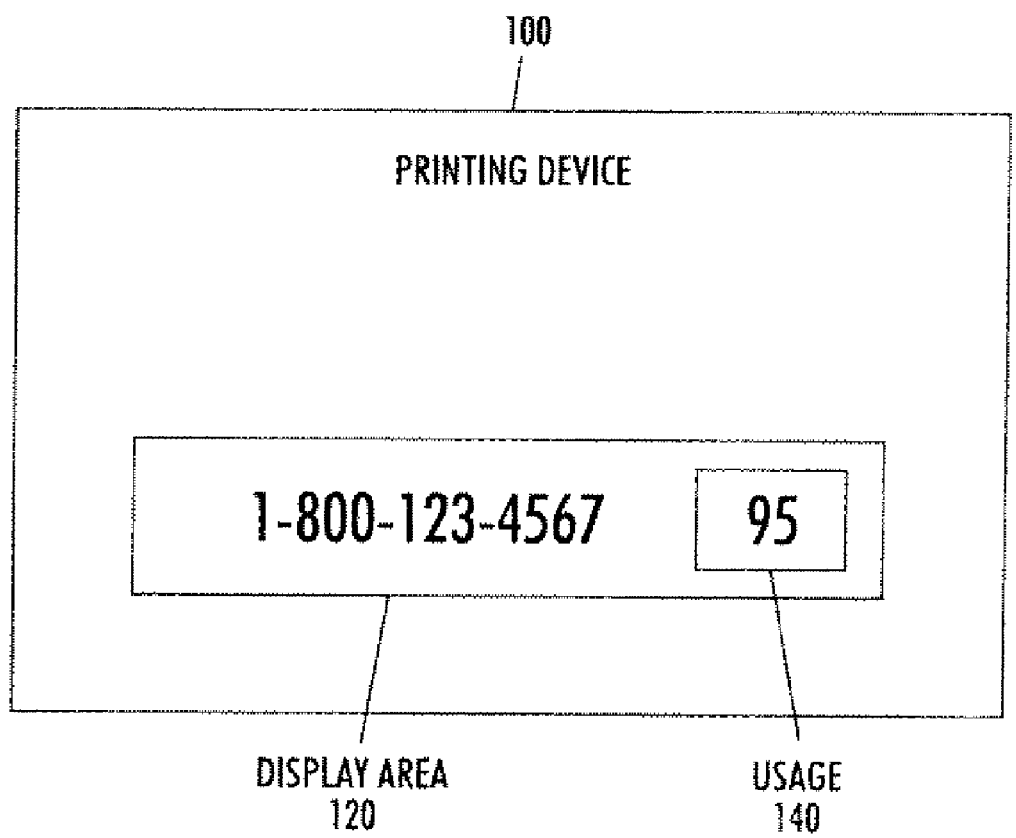
FIG. 4 discloses one embodiment of a service phone number displayed on a printing device.

Alternatively, the reward may allow the customer to call a priority service number when the printing device has a problem or requires maintenance. In one embodiment, different service phone numbers or contact information may be given to a printing device depending on its usage. In one embodiment, the contact information may be displayed on the printing device. In another embodiment, the information may be printed by the printing device. FIG. 4 discloses one embodiment of a service phone number displayed on a printing device. In one embodiment, a service number may be displayed in the display area 120 of the printing device 100. If the usage profile exceeds a certain target, a priority service number may be displayed. In one embodiment, the usage profile must exceed 85% of target. In FIG. 4, the usage profile 140 may be 95% of target and therefore the display area 120 displays a priority service number.

Additionally or alternatively, the customer reward may be cumulative. In one embodiment the reward may be given as point values. A customer may then purchase various rewards with various points. For example, for a certain number of points, a customer may buy a printing device model with a lower cost per copy and for a different number of points, the customer may obtain free supplies such as a free ink cartridge.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
monitoring at least one printing device via a communication network;
receiving, by a computing device, a usage profile from the at least one printing device, wherein the usage profile includes data that reflects usage information for the at least one printing device over a period of time;
comparing, by the computing device, the usage profile to a service history profile to create a service-dependent usage profile; and
if the service-dependent usage profile satisfies a reward criterion, providing a user of the at least one printing device with a reward.

2. The method of claim 1, wherein:
the service history profile comprises data representative of a time period when the at least one printing device was repaired or serviced; and
creating the service-dependent usage profile comprises comparing the usage profile to the service history profile to account for at least one period of low usage during which the printing device was repaired, inactive, maintained, or serviced.

3. The method of claim 1, wherein the service history profile comprises past usage profiles and accounts for time periods of low usage of the at least one printing device.

4. The method of claim 1, wherein:
the usage information comprises a measurement of usage of at least one printer device consumable;
the service history profile comprises data representative of a time period when the at least one printing device was repaired or serviced;
creating the service-dependent usage profile comprises comparing, by the computing device, the usage profile to the service history profile to account for at least one time period of low usage of the consumable during which the printing device was repaired, inactive, maintained, or serviced; and
the reward criterion includes a target usage of the consumable by the printing device over the time period.

5. The method of claim 1, wherein the usage information comprises a number of clicks of a printer device function.

6. The method of claim 1, further comprising determining, by the computing device, whether the usage profile exceeds a threshold level before comparing the usage profile to the service history profile.

7. The method of claim 1, wherein the creation of a service-dependent usage profile further comprises: averaging, by the computing device, the usage profile with one or more past usage profiles from the service history profile.

8. The method of claim 1, wherein the creation of a service-dependent usage profile further comprises extrapolating, by the computing device, usage from the usage profile using the service history profile.

9. The method of claim 1 further comprising, by the computing device prior to comparing the usage profile, aggregating a usage profile from a first printing device with a usage profile from a second printing device to create a cumulative usage profile.

10. The method of claim 9, further comprising:
displaying data representing the cumulative usage profile on the first printing device; and
displaying data representing the cumulative usage profile on the second printing device.

11. The method of claim 1, wherein the reward criterion comprises a trend in usage over a period of time.

12. The method of claim 1, wherein the providing a user of the at least one printing device with a reward comprises at least one of the following:
displaying data corresponding to the reward on the computing device, and
using the at least one printing device to print data corresponding to the reward.

13. The method of claim 1, wherein the providing a user of the at least one printing device with a reward comprises transmitting data corresponding to the reward to the user.

14. The method of claim 1, wherein the reward comprises one or more of the following: the ability to trade up, a promotional offer, and a coupon.

15. The method of claim 1, wherein the reward comprises displaying a priority service center number on the at least one printing device.

16. A method comprising:
monitoring at least one printing device via a communication network;
receiving, by a computing device, a usage profile from the at least one printing device, wherein the usage profile includes data that reflects usage of a consumable by the at least one printing device over a period of time;
comparing, by the computing device, the usage profile to a service history profile, wherein the service history profile comprises past usage profiles and accounts for time periods of low usage of at least one of the printing devices, to create a service-dependent usage profile; and
if the service-dependent usage profile satisfies a reward criterion, providing a user of the at least one printing device with a reward.

17. The method of claim 16, wherein the creation of a service-dependent usage profile further comprises averaging, by the computing device, the usage profile with one or more past usage profiles from the service history profile.

18. The method of claim 16, wherein the creation of a service-dependent usage profile further comprises extrapolating, by the computing device, usage from the usage profile using the service history profile.

19. The method of claim 16, wherein the reward criterion comprises a trend in usage over a period of time.

20. The method of claim 14, wherein the reward comprises displaying a priority service center number on the at least one printing device.

21. The method of claim 1, wherein:
the service history profile comprises data representative of a time period when the at least one printing device was repaired or serviced;
creating the service-dependent usage profile comprises comparing the usage profile to the service history profile to account for at least one time period of low usage of the consumable during which the printing device was repaired, inactive, maintained, or serviced; and
the reward criterion includes a target usage of the consumable by the printing device over the time period.

22. A system comprising:
a server that receives a usage profile from a printing device and compares the usage profile to a service history profile to create a service-dependent usage profile;
wherein the at least one printing device displays information corresponding to the usage profile and receives a reward if the service-dependent usage profile satisfies a reward criterion.

23. The system of claim 22, wherein the usage profile includes data that reflects usage of a consumable by the at least one printing device over a period of time.

* * * * *